United States Patent [19]

Thurston et al.

[11] 3,853,565
[45] Dec. 10, 1974

[54] SILVER HALIDE PHOTOGRAPHIC SUPERSENSITISING DYE COMBINATION

[75] Inventors: Elvin Frederick William Thurston; John Gabriel Valentine Scott, both of Ilford, England

[73] Assignee: Ilford Limited, Ilford, Essex, England

[22] Filed: Apr. 18, 1973

[21] Appl. No.: 352,483

[30] Foreign Application Priority Data
Apr. 26, 1972   Great Britain .................... 19409/72

[52] U.S. Cl. ..................................... 96/124, 96/137
[51] Int. Cl. ............................................. G03c 1/14
[58] Field of Search .............................. 96/124, 137

[56] References Cited
UNITED STATES PATENTS

| | | | |
|---|---|---|---|
| 3,348,949 | 10/1967 | Bannert et al. ....................... | 96/124 |
| 3,702,251 | 11/1972 | Sato et al. ............................. | 96/124 |

*Primary Examiner*—J. Travis Brown
*Attorney, Agent, or Firm*—Wenderoth, Lind & Ponack

[57] ABSTRACT

The present invention relates to a photographic silver halide emulsion or emulsion layer which comprises a supersensitising combination of (1) a bis-benzothiazole or other bis-azole trimethincyanine dye and (2) a trifluormethylbenzimidazole-benzoxazole trimethincyanine dye.

6 Claims, No Drawings

SILVER HALIDE PHOTOGRAPHIC SUPERSENSITISING DYE COMBINATION

Photographic silver halide emulsions have a certain natural sensitivity to light but this is restricted to a short range of wavelengths in the ultra-violet and/or blue regions of the spectrum. The effect of incorporating a sensitising dye is to impart to the emulsion sensitivity to light of other wavelengths. It has been known for some years that by incorporating in the emulsion, together with the sensitising dye, a second substance which may or may not itself be a sensitising dye, there may be sometimes be imparted to the emulsion an additional sensitivity beyond that which can be regarded as the sum effect of the separate substances. Combinations of sensitising dye and other substances which give this better result are known as super-sensitising combinations.

The present invention relates to a new super-sensitising combination of the type just referred to.

According to the present invention there is provided a light sensitive photographic silver halide material which comprises a super-sensitising combination which consists of a sensitising dye of the formula (1)
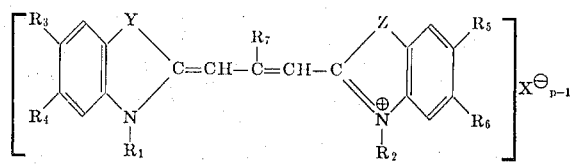

wherein $R_1$ and $R_2$ are each alkyl groups, or a group A-Q where A is a straight or branched alkylene chain containing 1-6 carbon atoms and Q is an amide, carboxylic acid or sulphonic acid group $R_3$, $R_4$, $R_5$ and $R_6$ are the same or different and each represents a hydrogen or halogen atom, or an alkyl, aryl, hydroxy or alkoxy group, $R_7$ is a lower alkyl group, Y and Z are each sulphur or selenium atoms or one of Y and Z is an oxygen atom the other being a sulphur or selenium atom X is an anion and $p$ is 1 in the case of a betaine-like molecular structure caused by the presence of a sulphonic acid in either or both $R_1$ and $R_2$ or by the presence of a carboxylic acid in both $R_1$ and $R_2$ and is 2 in the case of a non-betaine-like molecular structure, together with a sensitising dye of the formula (2)
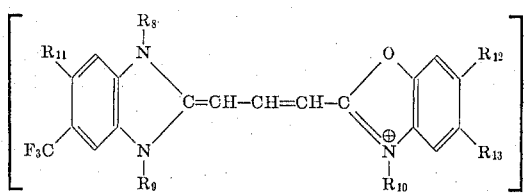

wherein $R_8$ is an alkyl group, $R_9$ and $R_{10}$ are each an alkyl group or one is an alkyl group and the other is a group A-Q where A is a straight or branched alkylene chain containing 1-6 carbon atoms and Q is an amide carboxylic acid or sulphonic acid group, $R_{11}$ is a hydrogen or halogen atom, or an alkyl or cyanogroup, $R_{12}$ is a hydrogen atom or a lower alkyl group, $R_{13}$ is a hydrogen atom or is a lower alkyl group or an aryl group which optionally is substituted U is an anion and $q$ is 1 in the case of a betaine-like molecular structure caused by the presence of a sulphonic acid group in Q and is 2 in the case of a non-betaine-like molecular structure.

Preferably in the dyes of formula (2) $R_{12}$ is a hydrogen atom and $R_{13}$ is a phenyl group.

It is to be understood that under certain conditions the dye of formula (1) which contains either two carboxylic acid groups or two sulphonic acid groups may be present in the emulsion as a salt. Dyes of this type for example dye A as set forth below are usually isolated as a salt and under certain conditions of coating the dye may be present in the coated emulsion still as a salt.

By lower alkyl groups is meant an alkyl group containing 1 to 4 carbon atoms.

Preferably 0.01 to 0.5 g of each sensitising dye of formula (1) and (2) per 1.5 g moles of silver present in the emulsion can be conveniently used.

Preferably the sensitising dyes of formula (1) correspond to the formula (3)
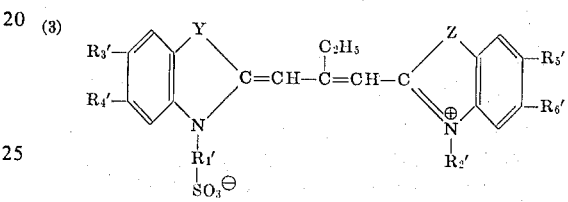

and the sensitising dyes of formula (2) correspond to the formula (4)
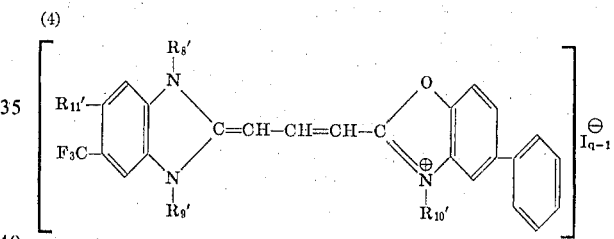

In formulae (3) and (4) Y and Z have the above indicated meaning, $R_1'$ represents a lower alkylene group, such as $(CH_2)_3$, $R_2'$ represents a lower alkyl or sulphoalkyl group, such as methyl, ethyl, sulphopropyl, $R_3'$ represents a hydrogen atom or a lower alkyl group, such as methyl, $R_4'$ represents a hydrogen atom, a lower alkyl or alkoxy group, such as methyl or ethoxy, $R_5'$ represents a hydrogen atom or a lower alkyl group, such as methyl, $R_6'$ represents a lower alkyl or alkoxy group, such as methyl or methoxy, $R_8'$ represents a lower alkyl group, such as ethyl, $R_{10}'$ represents a lower alkyl group, such as ethyl, $R_{11}'$ represents a hydrogen or chlorine atom, $q$ is 1 or 2, and, if $q$ is 1 $R_9'$ represents a lower sulphoalkyl group, such as sulphopropyl and if $q$ is 2 $R_9'$ represents a lower alkyl group, such as ethyl.

Preferably 0.01 to 0.5 g of each sensitising dye of formula (1) and (2) per 1.5 g moles of silver present in the emulsion can be conveniently used.

The silver halide emulsion to which the supersensitising combination of dyes hereinbefore set forth may be added or may comprise any of the normal silver halide and halide mixtures used in photographic material for example silver chloride, silver bromide, silver iodobromide and silver chlorobromide. The emulsion binder may be gelatin or it may comprise other polymeric substances for example polyvinyl alcohol, polyvinyl pyrrolidone, ethyl cellulose or an alginate either alone or in admixture with the gelatin. There may be present in the emulsion layer a dispersion of a water-insoluble polymeric substance for example a polyacrylate or methacrylate.

The silver halide emulsion to which the supersensitising combination of dyes hereinbefore set forth may be added may contain the usual sulphur sensitisers for example thiourea or thiosulphate and they may in addition be sensitised with a noble metal, for example gold. Furthermore it may comprise polyethylene glycol sensitisers and the usual tetraazaindene stabilisers and may contain further stabilisers for example cadmium or mercury salts. The emulsion may also contain development antifoggants. The emulsion may also contain colour couplers, filter dyes and acutance dyes.

By use of the combination of sensitising dyes as just set forth a valuable effect is obtained and is illustrated by the specific Example.

In the Example which follows the following dyes of formula (1) were used:

A. Anhydro-bis-[5,6-dimethyl-3-(3-sulphopropyl)-2-benzoselenazole]β-ethyltrimethincyanine hydroxide, sodium salt, which has the formula (5)
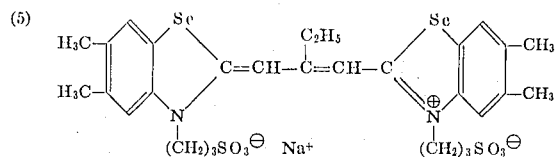

B. Anhydro-[5-ethoxy-3-(3-sulphopropyl)-2-benzothiazole](3-ethyl-5-methyl-2-benzoselenazole) β-ethyltrimethincyanine hydroxide, which has the formula (6)
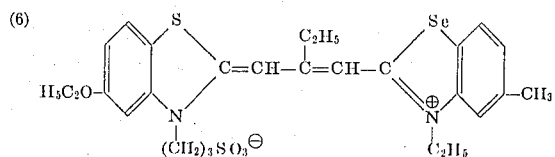

C. Anhydro-[3-(3-sulphopropyl)-2-benzothiazole](5-methoxy-3-methyl-2-benzoxazole) β-ethyltrimethincyanine hydroxide which has the formula (7)
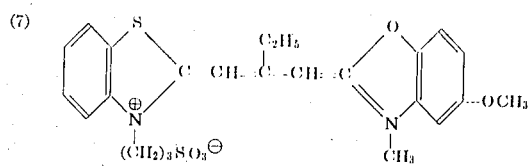

Also in the Example the following dyes of formula (2) were used:

D. Anhydro-[1-ethyl-3-(4-sulphobutyl)-5-trifluoromethyl-2-benzimidazole](3-ethyl-5-phenyl-2-benzoxazole)trimethincyanine hydroxide, which has the formula (8)
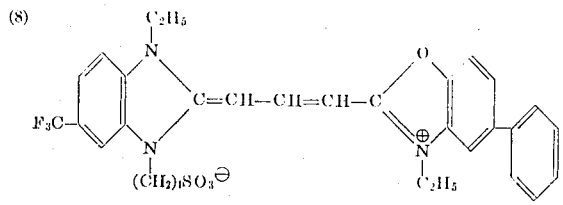

E. (1,3-Diethyl-5-chloro-6-trifluoromethyl-2-benzimidazole) (3-ethyl-5-phenyl-2-benzoxazole)-trimethincyanine iodide, which has the formula (9)
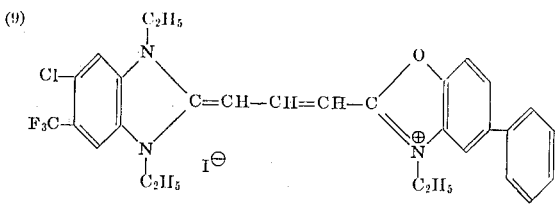

EXAMPLE

The above Dyes A, B, C, D and E were added to a high speed silver iodobromide emulsion containing 2.4 mol per cent of silver iodide, after digestion of the emulsion, the quantity shown for each dye being the amount per 1.5 g moles of silver halide. The emulsion was divided into portions and each portion was coated onto a film strip. After exposure the strips were developed and the relative log speed of the emulsions were determined. The speeds are relative log speeds measured to light passing through a suitable filter, the term "relative log speed" being directly related to the logarithm of the reciprocal of the exposure in meter-candle-seconds required to produce a density of 0.1 above fog. A higher figure indicates a higher speed. The filter used was the tricolour red, No. 204 of the Ilford Colour Filters handbook.

TABLE

| Dye g. | Dye g. | S 0.1 (0.2" exposure through filter 204) | S 0.1 (1/30" exposure to white light) |
|---|---|---|---|
| A 0.1 | | 2.69 | |
| A 0.06 | D 0.1 | 2.50 | |
| B 0.1 | D 0.04 | 3.00 | |
| | | | 4.10 |
| B 0.02 | D 0.1 | | 4.20 |
| A 0.1 | D 0.08 | | 4.27 |
| | E 0.1 | 2.69 | |
| A 0.06 | E 0.04 | 2.50 | |
| B 0.1 | | 2.82 | |
| | E 0.1 | | 4.08 |
| B 0.045 | E 0.055 | | 4.08 |
| C 0.2 (optimum amount) | | | 4.17 |
| | | | 4.84 |
| | D 0.125 (optimum amount) | | 4.82 |
| C 0.08 | D 0.075 | | 4.95 |

In the case of the dye C and dye D comparisons the amounts of each dye chosen where those which showed the greatest effect when tested alone.

These results show that when a combination of a dye of formula (1) and of formula (2) are present together in the silver halide emulsion a useful increase in the red speed of the emulsion is obtained.

We claim:

1. A photographic silver halide material which comprises a super-sensitising combination which consists essentially of a sensitising dye of the formula

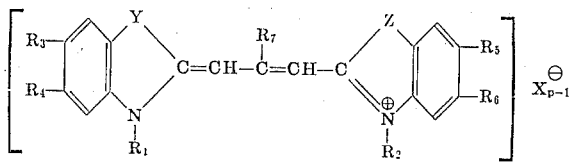

wherein $R_1$ and $R_2$ are each alkyl groups, or a group A-Q where A is a straight or branched alkylene chain containing 1-6 carbon atoms and Q is an amide, carboxylic acid or sulphonic acid group, $R_3$, $R_4$, $R_5$ and $R_6$ are the same or different and each represents a hydrogen or halogen atom, or an alkyl, aryl, hydroxy or alkoxy group, $R_7$ is a lower alkyl group, Y and Z are each sulphur or selenium atoms or one of Y and Z is an oxygen atom the other being a sulphur or selenium atom, X is an anion and $p$ is 1 in the case of a betaine-like molecular structure caused by the presence of a sulphonic acid in either or both $R_1$ and $R_2$ or by the presence of a carboxylic acid in both $R_1$ and $R_2$ and p is 2 in the case of a non-betaine-like molecular structure, together with a sensitising dye of the formula

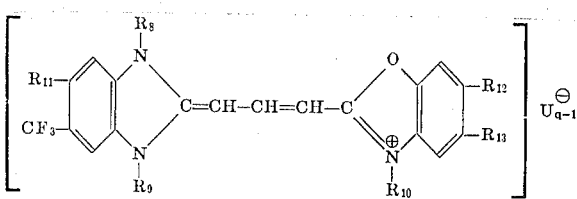

wherein $R_8$ is an alkyl group, $R_9$ and $R_{10}$ are each an alkyl group or one is an alkyl group and the other is a group A-Q where A is a straight or branched alkylene chain containing 1-6 carbon atoms and Q is an amide carboxylic acid or sulphonic acid group, $R_{11}$ is a hydrogen or halogen atom, or an alkyl or cyano group $R_{12}$ is a hydrogen atom or a lower alkyl group, $R_{13}$ is a hydrogen atom or is a lower alkyl group or an aryl group which optionally is substituted, U is an anion and $q$ is 1 in the case of a betaine-like molecular structure caused by the presence of a sulphonic acid group in Q and 9 is 2 in the case of a non-betaine-like molecular structure.

2. A photographic silver halide material according to claim 1 wherein in the dyes of the second formula set forth in claim 1 $R_{12}$ is a hydrogen atom and $R_{13}$ is a phenyl group.

3. A photographic silver halide material according to claim 2 which comprises a super-sensitising combination which consists essentially of a sensitising dye of the formula

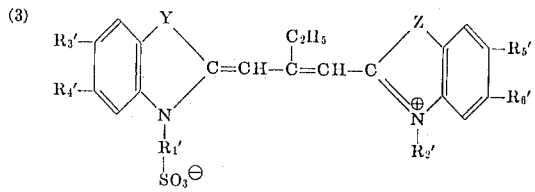

together with a trimethincyanine dye of the formula

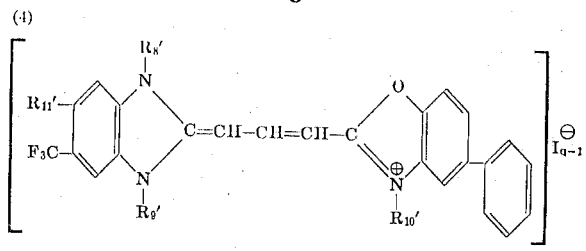

wherein Y and Z have the meaning as in claim 2, $R_1'$ represents a lower alkylene group, $R_2'$ represents a lower alkyl or sulphoalkyl group, $R_3'$ represents a hydrogen atom or a lower alkyl group, $R_4'$ represents a hydrogen atom, a lower alkyl group or a lower alkoxy group, $R_5'$ represents a hydrogen atom or a lower alkyl group, $R_6'$ represents a lower alkyl or alkoxy group, $R_8'$ represents a lower alkyl group, $R_{10}'$ represents a lower alkyl group, $R_{11}'$ represents a hydrogen atom or a chlorine atom, q is 1 or 2, and, if $q$ is 1 $R_9'$ represents a lower sulphoalkyl group, and, if $q$ is 2 $R_9'$ represents a lower alkyl group.

4. A photographic silver halide material according to claim 1 which contains from 0.01 to 0.5 of each sensitising dye of the two formulae set forth in claim 1 per 1.5 g moles of silver present in the emulsion.

5. A photographic silver halide emulsion layer which comprises a super-sensitising combination as defined in claim 1.

6. A photographic silver halide emulsion which comprises a supersensitising combination as defined in claim 1, which combination consists essentially of one of the sensitising dyes selected from the group consisting of dyes of the formulae

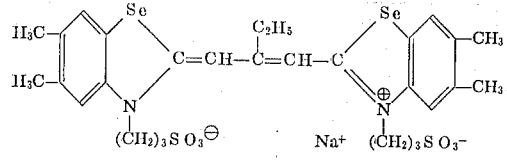

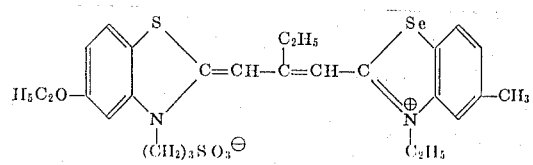

and

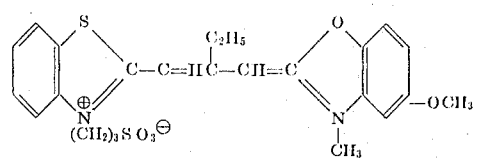

together with one of the sensitising dyes selected from the group consisting of dyes of the formulae
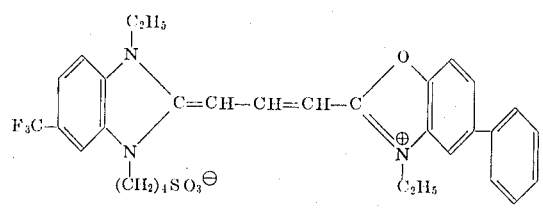
and
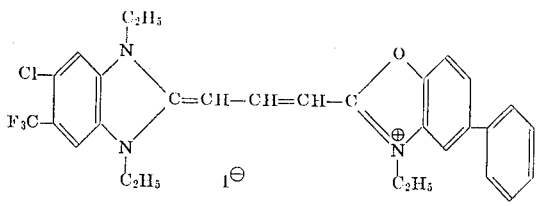
* * * * *